(12) United States Patent
Nakai (10) Patent No.: US 9,715,719 B2
(45) Date of Patent: Jul. 25, 2017

(54) DISPLAY SYSTEM AND DRIVING METHOD THEREOF

(71) Applicant: BOE TECHNOLOGY GROUP CO., LTD., Beijing (CN)

(72) Inventor: Tadashi Nakai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 148 days.

(21) Appl. No.: 14/437,153

(22) PCT Filed: Aug. 22, 2014

(86) PCT No.: PCT/CN2014/085047
§ 371 (c)(1),
(2) Date: Apr. 20, 2015

(87) PCT Pub. No.: WO2015/143829
PCT Pub. Date: Oct. 1, 2015

(65) Prior Publication Data
US 2016/0267627 A1    Sep. 15, 2016

(30) Foreign Application Priority Data

Mar. 24, 2014 (CN) .......................... 2014 1 0111902

(51) Int. Cl.
*G09G 3/34* (2006.01)
*G06T 3/40* (2006.01)
(Continued)

(52) U.S. Cl.
CPC .............. *G06T 3/40* (2013.01); *G06T 3/4076* (2013.01); *G09G 3/2096* (2013.01);
(Continued)

(58) Field of Classification Search
None
See application file for complete search history.

(56) References Cited

U.S. PATENT DOCUMENTS

| 8,847,876 B2 * | 9/2014 | Cho | G09G 3/3426 345/102 |
| 2006/0012616 A1 * | 1/2006 | Paek | G09G 3/20 345/698 |

(Continued)

FOREIGN PATENT DOCUMENTS

| CN | 101286305 A | 10/2008 |
| CN | 101465107 A | 6/2009 |

(Continued)

OTHER PUBLICATIONS

Aug. 28, 2015—(CN)—First Office Action Appn 201410111902.2 with English Tran.
(Continued)

*Primary Examiner* — Ryan M Gray
(74) *Attorney, Agent, or Firm* — Banner & Witcoff, Ltd.

(57) ABSTRACT

A display system is provided. The display system comprises a display module, a signal control module, an image processing module, a backlight control module and backlight source modules; the signal control module is configured to transmit an image scaling signal and an image composition signal to the image processing module, wherein the image scaling signal is used for instructing the image processing module to scale each frame of image according to an image scaling ratio, and the image composition signal is used for instructing to synthesize the scaled image and a background image into one frame of image according to the position intended to display the scaled image; and transmit a backlight control signal to the backlight control module wherein the backlight control signal is used for instructing the backlight control module to only turn on the backlight source modules corresponding to the position intended to display the scaled image.

14 Claims, 5 Drawing Sheets

(51) Int. Cl.
*G09G 3/36* (2006.01)
*G09G 3/20* (2006.01)

(52) U.S. Cl.
CPC ......... *G09G 3/3406* (2013.01); *G09G 3/3426* (2013.01); *G09G 3/36* (2013.01); *G09G 3/3611* (2013.01); *G09G 2320/0606* (2013.01); *G09G 2320/0686* (2013.01); *G09G 2320/08* (2013.01); *G09G 2330/021* (2013.01); *G09G 2330/022* (2013.01); *G09G 2340/04* (2013.01); *G09G 2340/0407* (2013.01); *G09G 2340/0457* (2013.01); *G09G 2370/08* (2013.01)

(56) References Cited

U.S. PATENT DOCUMENTS

| | | | | |
|---|---|---|---|---|
| 2008/0284719 | A1* | 11/2008 | Yoshida | G02F 1/136277 345/102 |
| 2009/0141197 | A1* | 6/2009 | Kim | G09G 5/006 348/790 |
| 2009/0237384 | A1* | 9/2009 | Hu | G06F 1/3218 345/211 |
| 2009/0322724 | A1 | 12/2009 | Smith | |
| 2010/0053222 | A1* | 3/2010 | Kerofsky | G09G 3/3406 345/690 |
| 2010/0328361 | A1* | 12/2010 | Kajiyama | G09G 3/3426 345/690 |
| 2011/0025725 | A1* | 2/2011 | Hulze | G09G 3/3426 345/690 |
| 2011/0037784 | A1* | 2/2011 | Shiomi | G09G 3/3426 345/690 |
| 2013/0271506 | A1* | 10/2013 | Lee | G09G 5/10 345/690 |
| 2013/0328878 | A1* | 12/2013 | Stahl | G06F 3/1431 345/428 |

FOREIGN PATENT DOCUMENTS

| | | |
|---|---|---|
| CN | 101645255 A | 2/2010 |
| CN | 201440318 U | 4/2010 |
| CN | 101751864 A | 6/2010 |
| CN | 101950546 A | 1/2011 |
| CN | 102087836 A | 6/2011 |
| CN | 102122492 A | 7/2011 |
| CN | 102137241 A | 7/2011 |
| CN | 102857643 A | 1/2013 |
| CN | 103533617 A | 1/2014 |
| CN | 103915072 A | 7/2014 |

OTHER PUBLICATIONS

Jan. 6, 2015—(WO) International Search Report and Written Opinion PCT/CN2014/085047 with Eng Tran.

\* cited by examiner

DISPLAY SYSTEM AND DRIVING METHOD THEREOF

The application is a U.S. National Phase Entry of International Application No. PCT/CN2014/085047 filed on Aug. 22, 2014, designating the United States of America and claiming priority to Chinese Patent Application No. 201410111902.2 filed on Mar. 24, 2014. The present application claims priority to and the benefit of the above-identified applications and the above-identified applications are incorporated by reference herein in their entirety.

TECHNICAL FIELD

The present disclosure relates to a field of display technique, and more particularly, to a display system and a driving method thereof.

BACKGROUND

With the increasing developments in the display technique, a size of the display system is larger and larger, which has reached a range of 47~110 inch or even more. Further, a resolution of the display system is higher and higher and has developed to an Ultra High Definition (UHD) from a Full High Definition (FHD), 4K*2k, or 8K*4k.

One issue of the display system with large size is its high power consumption, and especially in a liquid crystal display system with a backlight function, the power consumed by its backlight is high, which goes against energy-saving. In a case that a user does not need a full screen display, the power-saving mode for displaying of the liquid crystal display system with large size is important. Currently, the full screen display of the liquid crystal display system is not good enough in energy-saving and still has a high power consumption.

SUMMARY

Embodiments of the present disclosure provide a display system and a driving method thereof which are capable of scaling an image in display according to user's requirements, so that the power consumption of the display system can be decreased in a procedure for displaying the scaled image, thus saving energy.

A display system provided in the embodiments of the present disclosure comprises a display module, a signal control module, an image processing module, a backlight control module and backlight source modules;

the signal control module is configured to, upon reception of an image scaling mode signal for an image scaling mode currently selected by a user, acquire an image scaling ratio for each frame of image and a position intended to display a scaled image on the display module carried in the image scaling mode signal, transmit the image scaling signal and an image composition signal to the image processing module, and transmit a backlight control signal to the backlight control module;

the image processing module is configured to scale each frame of image to be output to the display module according to the image scaling ratio upon reception of the image scaling signal, and synthesize the scaled image and a background image into a frame of composition image upon reception of the image composition signal;

the display module is configured to display the composition image upon reception of the composition image; and the backlight control module is configured to, upon reception of the backlight control signal, control only the backlight source modules in a backlight area corresponding to the position among the backlight source modules to be turned on.

Optionally, given the image scaling ratio is n:1, the image processing module is further configured to: upon reception of the image scaling signal, determine an original resolution of the image before the scaling, convert the image with the original resolution into an image with a current resolution according to the image scaling ratio, wherein the image with resolution subjected to conversion is the scaled image, and the current resolution is 1/n of the original resolution, wherein n is a positive integer.

Optionally, the background image is a pure black image.

Optionally, the image scaling mode currently selected by the user is: a 1/4 scaling mode in display at a fixed position, a 1/16 scaling mode in display at a fixed position, a 1/4 scaling mode under dynamic display at a plurality of positions, and a 1/16 scaling mode under dynamic display at a plurality of positions.

Optionally, the scaling mode under the dynamic display at the plurality of positions is: the position intended to display the scaled image varies with preset displacement per m frames of image.

Optionally, the backlight source module connected with the backlight control module is a direct type backlight source module or an edge type backlight source module.

Optionally, the display system further comprises a remote controller and a remote control photosensitive element connected with the signal control module;

the remote controller is configured to transmit the image scaling mode signal currently selected by the user to the remote control photosensitive element under a control of a signal input by the user, and the remote control photosensitive element transmits the received image scaling mode signal to the signal control module.

Optionally, the system further comprises an On Screen Display module connected with the signal control module and the display module, and the signal control module is further configured to transmit an image scaling mode selection signal to the On Screen Display module upon reception of the image scaling mode selection signal currently selected by the user, and the On Screen Display module is configured to display a plurality of different image scaling modes pre-stored on the display module so as to be selected by the user upon reception of the image scaling mode selection signal.

The embodiments of the present disclosure further provide a method for driving the display system described above, comprising:

receiving an image scaling mode signal currently selected by a user;

acquiring an image scaling ratio for each frame of image and a position intended to display a scaled image on a display module carried in the image scaling mode signal;

transmitting an image scaling signal and an image composition signal to the image processing module, and transmitting, by the image processing module, a composition image subjected to being synthesized to the display module so as to be displayed, wherein the image scaling signal is used for instructing the image processing module to scale each frame of image according to the image scaling ratio, and the image composition signal is used for instructing the image processing module to synthesize the scaled image and a background image into one frame of image according to the position;

transmitting a backlight control signal to the backlight control module, wherein the backlight control signal is used for instructing the backlight control module to turn on only the backlight source modules corresponding to the position intended to display the scaled image.

Optionally, the method further comprises, before receiving the image scaling mode signal currently selected by the user: receiving an image scaling mode signal currently selected by the user, transmitting the image scaling mode selection signal to the On Screen Display module; and displaying, by the On Screen Display module, a plurality of different image scaling modes pre-stored on the display module so as to be selected by the user, upon reception of the image scaling mode selection signal.

In the display system according to the embodiments of the present disclosure, the position is used to display the scaled image, the size of the scaled image is smaller than a screen size of the display module, areas on the display module other than the position intended to display the scaled image are not required to display any images, and the corresponding backlight source modules are turned off, and only the backlight source modules corresponding to the position intended to display the scaled image are turned on, so that the power consumption of the display system can be decreased in a process for displaying the scaled image, achieving energy-saving. Following requirements of the users can be satisfied, for example, for a display module with large size or super large size, when the user is viewing news or a weather forecast, he/she can view the images or pictures only within a limited area on the display screen with large size or super large size, instead of viewing on the whole display screen with large size or super large size consuming high power.

DETAILED DESCRIPTION

Embodiments of the present disclosure provide a display system and a driving method thereof which are capable of scaling an image according to user's requirements and displaying the scaled image on a part of area on a display module, so that the power consumption of the display system can be decreased during the displaying of the scaled image, thus achieving energy-saving.

Figure 1:
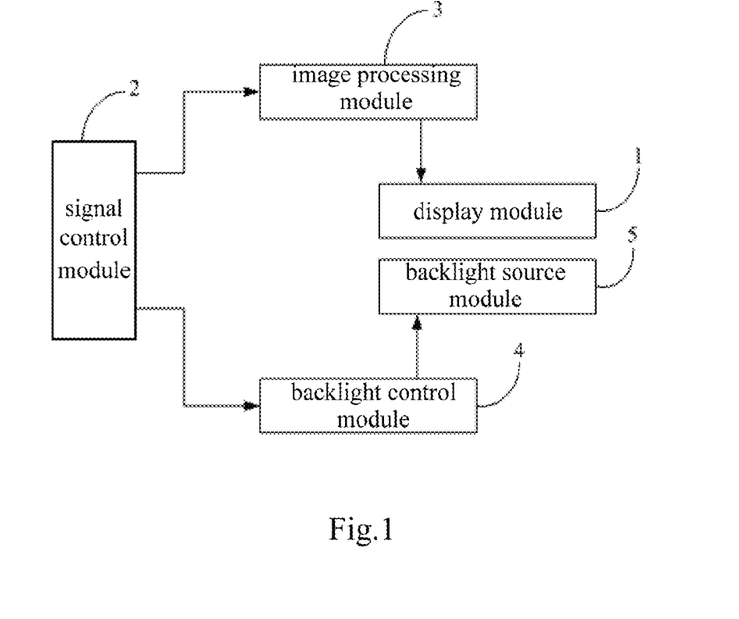
FIG. 1 illustrates a first example of a display system according to embodiments of the present disclosure.

Referring to FIG. 1, a display system provided in the embodiments of the present disclosure comprises:

a display module 1, a signal control module 2, an image processing module 3, a backlight control module 4 and backlight source modules 5;

the signal control module 2 is configured to, upon reception of an image scaling mode signal currently selected by a user, acquire an image scaling ratio for each frame of image and a position intended to display a scaled image on the display module carried in the image scaling mode signal, transmit an image scaling signal and an image composition signal to the image processing module 3, wherein the image scaling signal instructs the image processing module 3 to scale each frame of image according to the image scaling ratio, and the image composition signal instructs the image processing module 3 to synthesize the scaled image and a background image into one frame of image according to the position intended to display a scaled image;

the signal control module 2 is configured to a backlight control signal to the backlight control module 4, wherein the backlight control signal instructs the backlight control module 4 to only turn on the backlight source module 5 corresponding to the position intended to display a scaled image;

the image processing module 3 is configured to, upon reception of the image scaling signal, scale the each frame of image to be output to the display module 1, and synthesize the scaled image and the background image into one frame of composition image upon reception of the image composition signal;

the display module 1 is configured to display the composition image upon reception of the composition image; and the backlight control module 4 is configured to, upon reception of the backlight control signal, control the backlight source modules 5 in a backlight area only corresponding to the position intended to display a scaled image.

The image scaling process according to the embodiments of the present disclosure refers to a process for scaling an image with a large resolution to an image with a small resolution, and an integrity of the scaled image would not be changed, but the scaled image would be displayed with a small number of pixels and occupy a small area on the display module.

In the display system according to the embodiments of the present disclosure, the position intended to display a scaled image is used to display the scaled image, the size of the scaled image is smaller than a screen size of the display module; areas on the display module other than the position intended to display a scaled image need not to display any images, their corresponding backlight source modules are turned off, and only the backlight source modules corresponding to the position intended to display a scaled image are turned on, so that the power consumption of the display system can be decreased in a process for displaying the scaled image, thus achieving energy-saving. Following requirements of the users can be satisfied, for example, for a display module with large size or super large size, when the user is viewing news or a weather forecast, he/she can view the images only within a limited area on the display screen with large size or super large size, instead of turning on the whole display screen with large size or super large size having high power consumption.

The display module is not limited to a liquid crystal display module with a large size or a super large size, and alternatively, it may be any suitable display module, which has the backlight source modules, with the large size or super large size.

The display module may be a display panel comprising a driving circuit, a TV set or a notebook computer, etc. The signal control module may be, but not limited thereto, a Center Processing Unit (CPU), the image processing module may be an image processor, the backlight control module may be a backlight control circuit, and the backlight source module may be any backlight source capable of providing the backlight, and optionally, the backlight source module may be a backlight source comprising a conversion circuit.

The image processing module comprises an image scaler and an image synthesizer, and is configured to process the image with the large resolution into the image with the small resolution, that is, the scaled image, according to the image scaling ratio, and synthesize the scaled image and the background image displayed on the full screen of the display module into one frame of image, wherein the scaled image is located at the position intended to display a scaled image in one frame of image, and a display effect of the synthesized image on the display module is as follows: the scaled image is displayed at the position intended to display a scaled image while the background image is displayed in the remaining area. Since the background image displayed on the remaining area does not include any information on the original image (i.e., the unscaled image) and is not needed to be viewed by the user, backlight source elements (such as Light Emitting Diodes, LEDs) in the backlight source modules corresponding to the remaining area can be turned off accordingly, so that the effect for saving energy can be achieved.

Optionally, the background image is a black or pure black image, so that the power consumed by the backlight source module can be reduced and a crosstalk in the scaled image caused by the background image can be decreased or avoided at the same time.

There is no limitation on a type of the backlight source module, which may be the direct type or the edge type, and the like. Further, there is no limitation on a type of the backlight source elements in the backlight source module either, which may be Organic Light Emitting Diodes (OLEDs) or LEDs.

It should be noted that the signal control module may be embodied as a CPU, and the signal control module according to the embodiments described above may reside on a System on Chip (SOC) in a Digital TV (DTV) when the display system is implemented as the TV set.

Figure 2:
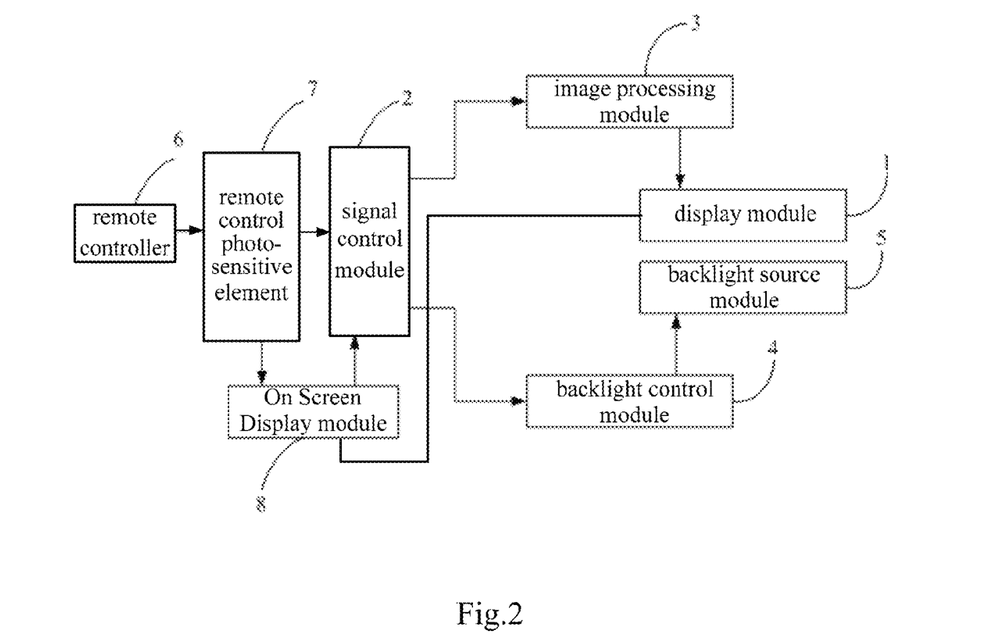
FIG. 2 illustrates a second example of the display system according to the embodiments of the present disclosure.

Based on the display system illustrated in FIG. 1, by referring to FIG. 2, the display system may further comprise a remote controller (Remote Control Unit, RCU) 6 and a remote control photosensitive element 7 (also be referred to as a remote control light-receiving means).

The remote controller 6 illustrated in FIG. 2 is used to transmit the image scaling mode signal currently selected by the user to the remote control photosensitive element 7 under a control of an input signal from the user, and the remote control photosensitive element 7 transmits the received image scaling mode signal to the signal control module 2.

The remote controller 6 is a common device having several input buttons. A current output signal is determined by selecting an input signal on the remote controller via the user, and the remote controller 6 communicates with the signal control module 2 by means of an infrared communication via communication between an emitting circuit on the remote controller 6 and the signal control module 2. A control signal sent by the remote controller 6 is converted into a flicker of the infrared light and is transmitted to the remote control photosensitive element 7 by the remote controller 6, and the remote control photosensitive element 7 transmits the received signal to the signal control module 2. The manner in which the infrared light flickers may be implemented by a Pulse Position modulation (PPM) scheme.

Referring to FIG. 2, based on the embodiments described above, the display system may further comprises:

An On Screen display (OSD) module 8, connected with the signal control module 2 and the display module 1, which is configured to display a plurality of pre-stored different image scaling modes on the display module 1 so as to be selected by the user, upon reception of an image scaling mode selection signal transmitted from the signal control module 2. More particularly, the On Screen Display module 8 is connected with the signal control module 2 and the display module 1, the signal control module 2 transmits the image scaling mode selection signal to the On Screen Display module 8 upon reception of the image scaling mode signal currently selected by the user, and the On Screen Display module 8 displays the pre-stored plurality of different image scaling modes on the display module 1 so as to be selected by the user upon reception of the image scaling mode selection signal.

It should be noted that before the image scaling mode currently selected is determined, the user may select one from the plurality of different image scaling modes displayed on the display module 1, and transmit the image scaling mode signal to the signal control module 2.

The user may select the image scaling mode by at least two schemes as follows.

Scheme 1: Image Scaling Mode is Determined Directly

The user may select a desired image scaling mode by pressing a button corresponding to a corresponding image scaling mode on the remote controller. For example, there are four buttons corresponding to image scaling modes on the remote controller, marked as Mode 1, Mode 2, Mode 3 and Mode 4 respectively. The user may select the respective image scaling mode by selecting the corresponding button, that is, pressing the respective button may indicate that the corresponding image scaling mode is selected, and a control circuit corresponding to this button may transmit this selected image scaling mode signal to the signal control module.

Of course, the user may also select the image scaling mode via a control button(s) disposed on the display module, and the control button communicates with the signal control module 2 without the remote controller and the remote control photosensitive element 7.

Scheme 2: The Desired Image Scaling Mode is Selected Through a Menu Displayed on the Display Module The display module is controlled to display the different image scaling modes in an energy-saving mode menu with a selection button on the remote controller for selecting the image scaling mode, and one of the image scaling modes may be selected through an up-down key/button or left-right key/button and an OK key/button. The selected image scaling mode signal is transmitted to the signal control module.

As compared with the Scheme 1, the manner for selecting the image scaling mode by means of the Scheme 2 may enhance visibility and experience effect of the user, since it is easy for the user to understand at a glance when the respective image scaling modes are displayed on the display module. It is required that the On Screen Display (OSD) module illustrated in FIG. 2 is disposed in the display system in order to implement the Scheme 2.

Optionally, the image scaling mode currently selected by the user may be one of following modes:

1. 1/4 scaling mode with display at a fixed position;
2. 1/16 scaling mode with display at a fixed position;
3. 1/4 scaling mode with a dynamic display at a plurality of positions; and
4. 1/16 scaling mode with a dynamic display at a plurality of positions.

Optionally, the scaling mode with a dynamic display at a plurality of positions: the position intended to display a scaled image varies with a preset displacement every m frames of image, so that visual fatigue can be avoid when the user views under the dynamic display at the plurality of positions.

Herein, the 1/4 and 1/16 are the image scaling radio described above.

The scaling mode can be exited via an exit button as disposed on the remote controller, or via an Off option as incorporated into a pull-down menu in the OSD energy-saving mode according to the embodiments of the present disclosure.

The pull-down menu in the energy-saving mode is only an exemplary implementation, and embodiments of the present disclosure are not limited thereto. That is to say, this implementation is only used for illustrating the embodiments of the present disclosure instead of limiting the scope of the embodiments of the present disclosure.

Optionally, given the image scaling ratio is n:1 (also referred to as 1/n scale, that is, the image with an original size of S is scaled to an image with a size of S/n with the contents in the picture unchanged only the resolution decreased), the image processing module 2 illustrated in FIG. 1 or 2 is further configured to:

upon reception of the image scaling signal, determine an original resolution of a un-scaled image, convert the image with the original resolution into an image with the current resolution according to the image scaling ratio, wherein the current resolution is 1/n of the original resolution, wherein n is a positive integer.

One implementation is as follows. Given the image scaling ratio is 4:1 and the original resolution of each frame of image is 8k*4k or 4k*2k, and the signal control module 2 is used to convert the image with the resolution of 8k*4k into an image with the resolution of 4k*2k, or convert the image with the resolution of 4k*2k into an image with the resolution of 2k*1k, upon reception of the image scaling signal.

Conversion of the image with the high resolution into the image with the low resolution scales pixels in fact, that is, an image which is displayed with 4n pixels originally is converted into an image which is displayed with n pixel, referred to as 1/4 scale of pixels.

A conversion among the resolutions of the display module (also referred to as dot per inch) is illustrated in Tables 1 and 2, by taking three embodiments as examples.

TABLE 1 the ¼ scale of pixels, resolution and corresponding number of pixels in the Embodiment 1 to Embodiment 3 before scaling.

|  | Resolution | Number of Pixels | |
| --- | --- | --- | --- |
| Embodiment 1 | 8k*4k | 7680 × 4320 | 33177600 |
| Embodiment 2 | 4k*2k | 3840 × 2160 | 8294400 |
| Embodiment 3 | FHD | 1920 × 1080 | 2073600 |

TABLE 2 the ¼ scale of pixels, resolution and corresponding number of pixels in the Embodiment 1 to Embodiment 3 after scaling.

|  | Resolution | Number of Pixels | |
| --- | --- | --- | --- |
| Embodiment 1 | 4k*2k | 3840 × 2160 | 8294400 |
| Embodiment 2 | FHD | 1920 × 1080 | 2073600 |
| Embodiment 3 | — | 960 × 540 | 518400 |

It can be seen from the Table 1 and Table 2, for the embodiment 1, the original resolution of the image is 8k*4k while the resolution of the scaled image is 4k*2k; for the embodiment 2, the original resolution of the image is 4k*2k while the resolution of the scaled image is 2k*1k (namely the resolution corresponding to the FHD); and for the embodiment 3, the original resolution of the image is 2k*1k while the resolution of the scaled image is 960×540.

Figure 3:
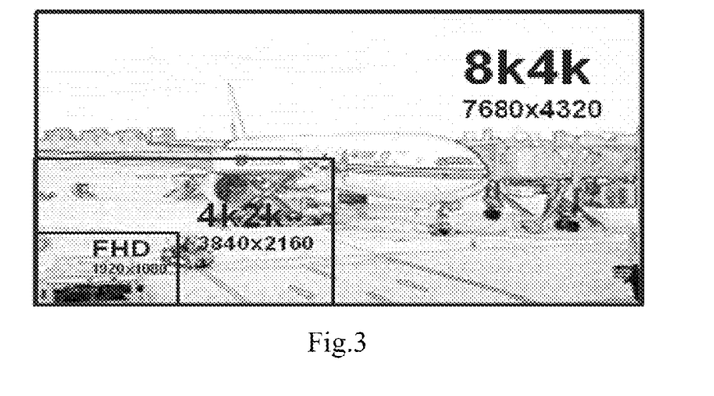
FIG. 3 is an exemplary view illustrating same pictures with a resolution of 4k*2k or 2k*1k, which are subjected to being scaled, displayed on a display screen corresponding to the resolution of 8k*4k provided in the embodiments of the present disclosure.

The same pictures with the different resolution are displayed on the same display screen, as illustrated in FIG. 3, and FIG. 3 illustrates the same picture, which is subjected to being scaled, with resolutions of 4k*2k or 2k*1k are displayed the display screen corresponding to the resolution of 8k*4k.

The scaled image displayed with the resolution of 4k*2k occupies 1/4 of an area of the display screen, and the scaled image displayed with the resolution of 2k*1k occupies 1/16 of the area of the display screen. In the embodiments of the present disclosure, the scaled picture occupying the 1/4 or 1/16 of the area of the display screen is displayed on the display screen with the resolution of 8k*4k, therefore the backlight sources can only supply the 1/4 or 1/16 of the area of the display screen corresponding to the scaled picture with the backlight while the backlight source corresponding the remaining regions on the display screen can be turned off, so that the displaying power consumption of the display system can be reduced.

On a basis of any one of the embodiments described above, the display module in the display system according to the embodiments of the present disclosure may further comprise a control interface for controlling the display module to display the image, also may be referred to as a timing controller. In this case, the display module illustrated in FIG. 1 or 2 may be configured to: display each frame of image corresponding to the current resolution on the region occupying 1/4 area of the display screen of the display module according to the current resolution and display the black picture on the remaining region, when the timing controller receives each frame of image with the current resolution. The displaying of black picture means that the timing controller controls the corresponding driving circuits to output a corresponding gray scale voltage for displaying the black picture to the corresponding pixels, or control switches for the pixels in the corresponding region to be turned off so as not to output any gray scale voltage to the pixels. The displaying of the scaled image may also means that the picture of the scaled image is inserted into the region where the scaled image to be displayed in a pre-condition that a black picture is displayed on the whole screen.

In the display system illustrated in FIG. 1 or 2, optionally, the signal control module 2 acquires the position, wherein each frame of image be displayed, carried in the image scaling mode signal, and for each frame of image, the position intended to display the scaled image may be a fixed value or a value varying with time.

If the position intended to display each frame of image to be displayed is the fixed value, it means that each frame of image is displayed on a fixed region of the display module, thus leading to an image sticking defect of the liquid crystal display module, and also causing variation in lifespan of the respective backlight source modules in the different regions within the display module, wherein the lifespan of the backlight source modules, corresponding to the region for displaying the scaled image, is shorter.

In order to address the issue of the image sticking on the liquid crystal display module and the lifespan of the backlight source module, Optionally, all the positions, for each frame of image to be displayed, carried in the image scaling mode signal which is acquired by the signal control module 2 are not identical. In particular, the user can select the "1/4 scaling mode in a dynamic display at a plurality of positions" and the "1/16 scaling mode in the dynamic display at the plurality of positions".

Particularly, the signal control module acquires an initial position intended to display a first frame of image and a first varying position every m frames of image from the image scaling mode signal, and determines the position intended to display each frame of image to be displayed on the display module, wherein m is a positive integer.

The signal control module determines a position of the backlight area, in which the backlight source modules are required, to be controlled by the backlight control module to be turned on, when each frame of image is displayed, according to the position intended to display each frame of image to be displayed on the display module, achieving energy-saving.

Solutions according to the above embodiments will be described in connection with drawings thereafter in order to make it clearer.

Figure 4:
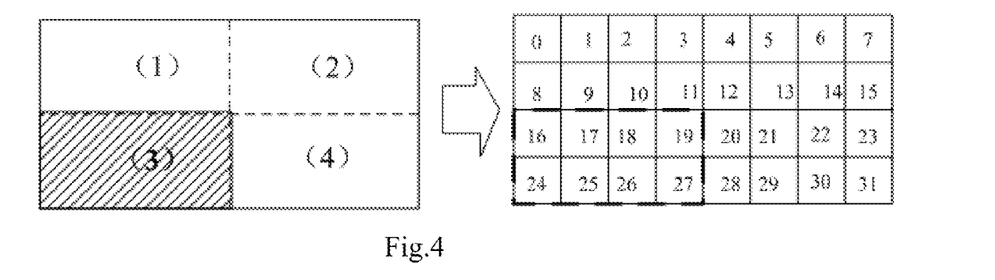
FIG. 4 is an exemplary view illustrating a correspondence between a display area for displaying the scaled image on a display module and a backlight area on a backlight source module according to the embodiments of the present disclosure.

One implementation is as follows. As illustrated in FIG. 4, as an example, in the display module with the resolution of 4k*2k (3840×2160), the direct type backlight source modules corresponding to the display module comprise 32 regions (labeled as 0~31 in FIG. 4). By taking the scaling ratio of 1/4 as an example for illustration, the resolution of the scaled image is 2k*1k (1920×1080), and the scaled image is located any one of the four display regions illustrated in FIG. 4 (the display region (1)~display region (4) as labeled in FIG. 4) when the composition image is displayed on the display module; and the backlight source module regions which are illuminated correspondingly comprise continuing 8 regions. For example, when the scaled image is displayed in the display region (3) in FIG. 4, the backlight source module regions 16~19 and the backlight source module regions 24~27 are turned on.

Another implementation is as follows.

Figure 5:
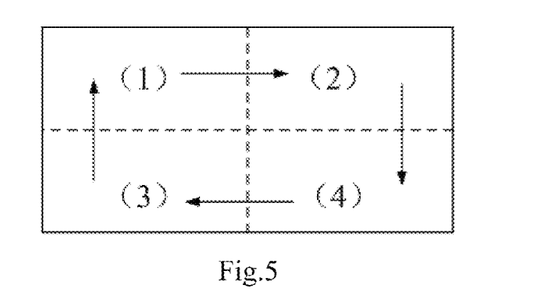
FIG. 5 is an exemplary view illustrating a change of the display area for displaying the scaled image on the display module according to the embodiments of the present disclosure.

As illustrated in FIG. 5, based on the embodiment illustrated in FIG. 4, the image processing module changes the position of the scaled image in the composition image per m frames. For example, the displaying position of the scaled image in the composition image varies per 50 frames. And, the position of the scaled image in the composition image may be repeated in an order of display regions (1)~(4). For example, the scaled image is located at the display region (1) during a duration of a first 50-frames of image, the scaled image is located at the display region (2) during a duration of a second 50-frames of image, the scaled image is located at the display region (3) during a duration of a third 50-frames of image, the scaled image is located at the display region (4) during a duration of a fourth 50-frames of image, the scaled image is located at the display region (1) during a duration of a fifth 50-frames of image, and so on. The number of interval frames m can be set depending on actual requirements.

Figure 6:
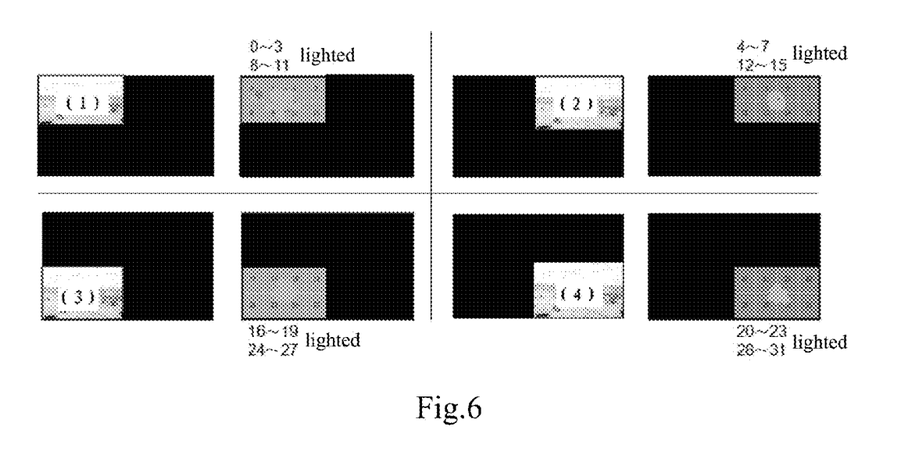
FIG. 6 is an exemplary view illustrating a correspondence relationship between a display area for displaying the scaled image on a display module corresponding to a direct type backlight source module and a backlight area on a backlight source module according to the embodiments of the present disclosure.

A correspondence relationship between the displayed picture of the scaled image and the displaying of the backlight source modules is as illustrated in FIG. 6.

Based on the above embodiments, the backlight source module regions 0~3 and the backlight source module regions 8~11 are illuminated while remaining backlight source module regions are turned off, when the scaled image is located at the display region (1);

the backlight source module regions 4~7 and the backlight source module regions 12~15 are illuminated while remaining backlight source module regions are turned off, when the scaled image is located at the display region (2);

the backlight source module regions 16~19 and the backlight source module regions 24~27 are illuminated while remaining backlight source module regions are turned off, when the scaled image is located at the display region (3); and the backlight source module regions 20~23 and the backlight source module regions 28~31 are illuminated while remaining backlight source module regions are turned off, when the scaled image is located at the display region (4).

Figure 7:
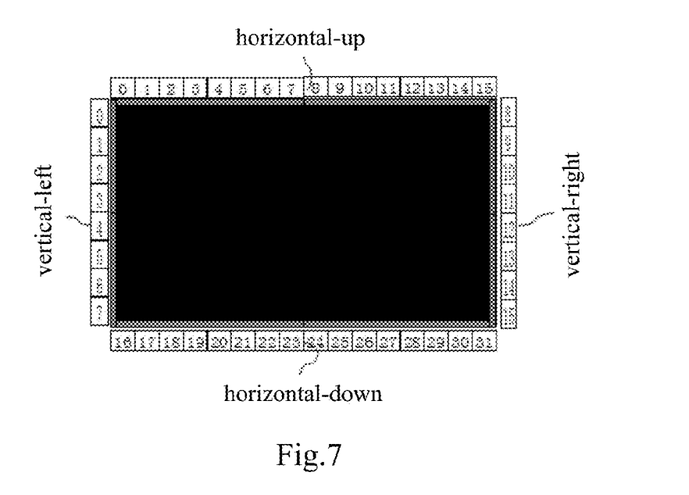
FIG. 7 is an exemplary view illustrating a structure of the backlight area arranged on an edge type backlight source module according to the embodiments of the present disclosure.

Implementations for an edge type backlight source module are similar to the implementations described above. As illustrated in FIG. 7, 32 backlight source module regions are disposed at four edge parts of the display module: the backlight source module regions 0~15 are disposed at an edge in the horizontal direction; the backlight source module regions 16~31 are disposed at an opposite edge in the horizontal direction; the backlight source module regions 0~7 are disposed at an edge in the vertical direction; and the backlight source module regions 8~15 are disposed at an opposite edge in the vertical direction.

Figure 8:
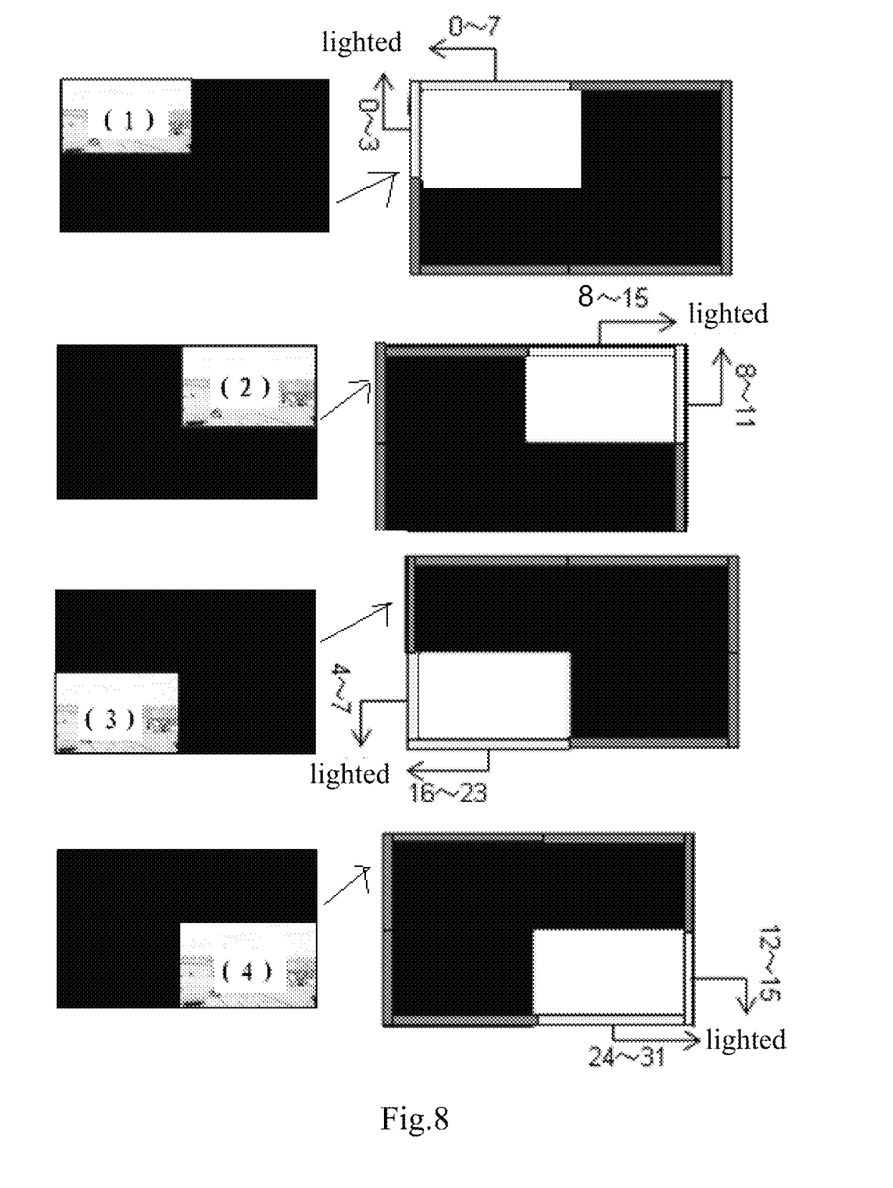
FIG. 8 is an exemplary view illustrating a correspondence relationship between a display area for displaying the scaled image on a display module corresponding to an edge type backlight source module and a backlight area on a backlight source module according to the embodiments of the present disclosure.

Referring to FIG. 8, the backlight source module regions 0~7 in the horizontal direction and the backlight source module regions 0~3 in the vertical direction are illuminated while remaining backlight source module regions are turned off, when the scaled image is located at the display region (1);

the backlight source module regions 8~15 in the horizontal direction and the backlight source module regions 8~11 in the vertical direction are illuminated while remaining backlight source module regions are turned off, when the scaled image is located at the display region (2);

the backlight source module regions 16~23 in the horizontal direction and the backlight source module regions 4~7 in the vertical direction are illuminated while remaining backlight source module regions are turned off, when the scaled image is located at the display region (3); and the backlight source module regions 24~31 in the horizontal direction and the backlight source module regions 12~15 in the vertical direction are illuminated while remaining backlight source module regions are turned off, when the scaled image is located at the display region (4).

Of course, the implementations for addressing the issues of image sticking on the liquid crystal display module and the lifespan of the backlight source module are not limited thereto, for example, the image display regions may comprise five and the first four display regions are similar to the display regions illustrated in FIG. 5 while the fifth one may be located at the center of the whole display module, and its details are not repeated herein.

It should be noted that, in the display system according to the embodiments of the present disclosure, the image frame to be processed by the image processing module may be provided through a Double Data Rate (DDR) Synchronous Dynamic Random Access Memory or from a signal source via CPU.

The display system according to the embodiments of the present disclosure may further comprise a Flash Memory connected with the CPU, which is used for temporarily storing various signals generated by the CPU or image data from the signal source.

Figure 9:
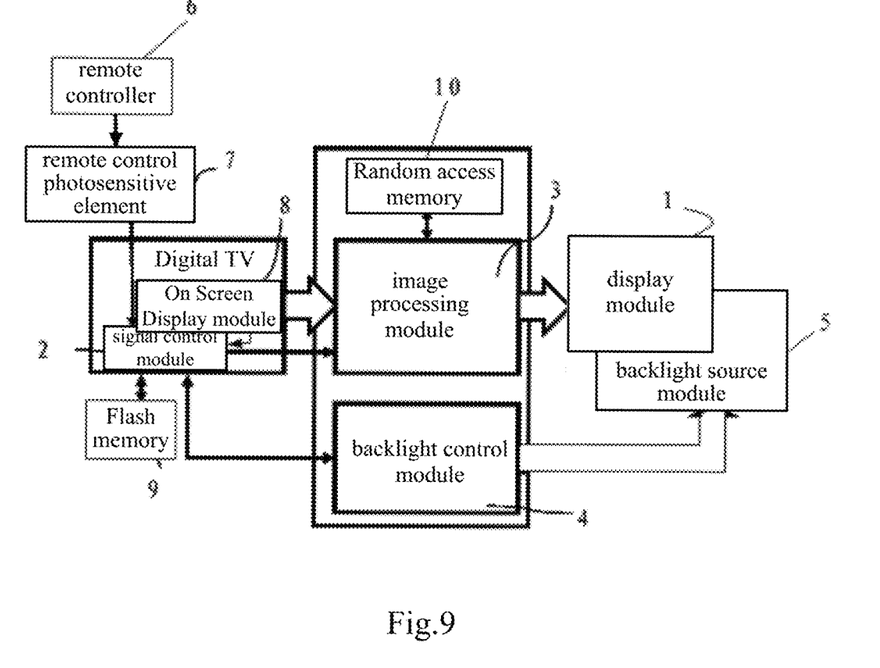
FIG. 9 is an exemplary view illustrating a third example of the structure of the display system according to the embodiments of the present disclosure.

FIG. 9 illustrates a display system according to the embodiments of the present disclosure, comprising:

the remote controller 6, the remote control photosensitive element 7 (RCU Rx), the signal control module (CPU) 2 resided on the System on Chip (SOC) in the Digital TV (DTV), the Flash Memory 9 connected with the signal control module 2, the image processing module (Scaler) 3 connected with the signal control module 2 via a bus, a random access memory DDR 10 connected with the image processing module 3, the display module 1 (Panel) connected with the image processing module (Scaler) 3, the backlight source modules 5 under the display module 1, the backlight control module 4 between the signal control module 2 and the backlight source modules 5, and the On Screen Display (OSD) module 8 connected with the CPU 2.

The embodiments of the present disclosure further provide a method for driving any one of the display system described above, comprising:

receiving the image scaling mode signal currently selected by the user;

acquiring the image scaling ratio for each frame of image and the position for each frame of image to be displayed on the display module carried in the image scaling mode signal;

transmit an image scaling signal and an image composition signal to the image processing module, wherein the image scaling signal instructs the image processing module to scale each frame of image according to the image scaling ratio, and the image composition signal instructs the image processing module to synthesize the scaled image and a background image into one frame of image according to the position intended to display the scaled image; and transmitting a backlight control signal to the backlight control module, wherein the backlight control signal instructs the backlight control module to turn on only backlight source modules corresponding to the position intended to display a scaled image.

Optionally, the method further comprises, before receiving the image scaling mode signal currently selected by the user: receiving the image scaling mode selection signal currently selected by the user, transmitting the image scaling mode selection signal to the On Screen Display module; and displaying, by the On Screen Display module, a plurality of different image scaling modes as pre-stored on the display module so as to be selected by the user, upon reception of the image scaling mode selection signal.

Obviously, those skilled in the art may make various changes and variations on the present disclosure without departing from the spirit and scope of the present disclosure. Thus, the present disclosure intends to cover the changes and variations to the present disclosure if such changes and variations belong to the scope defined by the attached claims and equivalence thereof.

This application claims the priority to a Chinese Patent Application No. 201410111902.2, filed on Mar. 24, 2014, in the China's State Intellectual Property Office, the disclosure of which is incorporated by reference herein as a whole.

What is claimed is:

1. A display system, comprising a display module, a signal control module, an image processing module, a backlight control module and backlight source modules;

the signal control module is configured to, upon reception of an image scaling mode signal for an image scaling mode currently selected by a user, acquire an image scaling ratio for each frame of image and a position intended to display a scaled image on the display module, carried in the image scaling mode signal, transmit the image scaling signal and an image composition signal to the image processing module, and transmit a backlight control signal to the backlight control module;

the image processing module is configured to scale each frame of image to be output to the display module according to the image scaling ratio, upon reception of the image scaling signal, and synthesize the scaled image and a background image into a frame of composition image upon reception of the image composition signal;

the display module is configured to display the composition image upon reception of the composition image; and the backlight control module is configured to, upon reception of the backlight control signal, control only the backlight source modules in a backlight area, corresponding to the position intended to display the scaled image, among the backlight source modules, to be turned on;

wherein the image scaling mode comprises a scaling mode in a dynamic display, and in the dynamic display, a position at which the scaled image is to be displayed varies with a preset displacement per m frames of image.

2. The display system of claim 1, wherein given that the image scaling ratio is n:1, the image processing module is further configured to: upon reception of the image scaling signal, determine an original resolution of the image before the scaling, convert the image with the original resolution into an image with a current resolution according to the image scaling ratio, wherein the current resolution is 1/n of the original resolution, and n is a positive integer.

3. The display system of claim 1, wherein the background image is a pure black image.

4. The display system of claim 1, wherein the image scaling mode further comprises a scaling mode in display at a fixed position; and at least one of the scaling mode in the dynamic display and the scaling mode in display at the fixed position comprises at least one of a 1/16 scaling mode and a 1/4 scaling mode.

5. The display system of claim 1, wherein the backlight source module connected with the backlight control module is a direct type backlight source module or an edge type backlight source module.

6. The display system of claim 1, further comprising a remote controller, and a remote control photosensitive element connected with the signal control module; wherein the remote controller is configured to transmit the image scaling mode signal currently selected by the user to the remote control photosensitive element under a control of a signal input from the user, and the remote control photosensitive element is configured to transmit the received image scaling mode signal to the signal control module.

7. The display system of claim 1, further comprising:

an On Screen Display module connected with the signal control module and the display module, and the signal control module is further configured to transmit the image scaling mode selection signal to the On Screen Display module upon reception of the image scaling mode signal currently selected by the user, and the On Screen Display module is configured to display a plurality of different image scaling modes pre-stored on the display module so as to be selected by the user upon reception of the image scaling mode selection signal.

8. A method for driving a display system comprising a display module, a signal control module, an image processing module, a backlight control module and backlight source modules, wherein the method comprises:

receiving, by the signal control module, an image scaling mode signal currently selected by a user;

acquiring, by the signal control module, an image scaling ratio for each frame of image and a position intended to display a scaled image on the display module, carried in the image scaling mode signal;

transmitting, by the signal control module, an image scaling signal and an image composition signal to the image processing module, and transmitting, by the image processing module, a composition image subjected to being synthesized to the display module so as to be displayed, the image scaling signal instructing the image processing module to scale each frame of image according to the image scaling ratio, and the image composition signal instructing the image processing module to synthesize the scaled image and a background image into one frame of image according to the position intended to display the scaled image;

transmitting, by the signal control module, a backlight control signal to the backlight control module, the backlight control signal instructing the backlight control module to only turn on the backlight source modules corresponding to the position intended to display the scaled image;

wherein the image scaling mode comprises a scaling mode in a dynamic display, and in the dynamic display, a position at which the scaled image is to be displayed varies with a preset displacement per m frames of image.

9. The method of claim 8, further comprising, before receiving the image scaling mode signal currently selected by the user: receiving the image scaling mode selection signal currently selected by the user, transmitting the image scaling mode selection signal to an On Screen Display module; and displaying, by the On Screen Display module, a plurality of different image scaling modes pre-stored on the display module so as to be selected by the user, upon reception of the image scaling mode selection signal.

10. The display system of claim 2, wherein the background image is a pure black image.

11. The display system of claim 2, wherein the image scaling mode further comprises a scaling mode in display at a fixed position; and at least one of the scaling mode in the dynamic display and the scaling mode in display at the fixed position comprises at least one of a 1/16 scaling mode and a 1/4 scaling mode.

12. The display system of claim 2, wherein the backlight source module connected with the backlight control module is a direct type backlight source module or an edge type backlight source module.

13. The display system of claim 2, further comprising a remote controller, and a remote control photosensitive element connected with the signal control module; wherein the remote controller is configured to transmit the image scaling mode signal currently selected by the user to the remote control photosensitive element under a control of a signal input from the user, and the remote control photosensitive element is configured to transmit the received image scaling mode signal to the signal control module.

14. The display system of claim 2, further comprising:

an On Screen Display module connected with the signal control module and the display module, and the signal control module is further configured to transmit the image scaling mode selection signal to the On Screen Display module upon reception of the image scaling mode signal currently selected by the user, and the On Screen Display module is configured to display a plurality of different image scaling modes pre-stored on the display module so as to be selected by the user upon reception of the image scaling mode selection signal.

* * * * *